United States Patent [19]

Harwood et al.

[11] 4,253,110
[45] Feb. 24, 1981

[54] AUTOMATIC KINESCOPE BEAM CURRENT LIMITER WITH SEQUENTIAL CONTROL MODES

[75] Inventors: Leopold A. Harwood, Bridgewater; Erwin J. Wittmann, North Plainfield, both of N.J.; Robert L. Shanley, II, Indianapolis, Ind.

[73] Assignee: RCA Corporation, New York, N.Y.

[21] Appl. No.: 103,445

[22] Filed: Dec. 14, 1979

[51] Int. Cl.³ .................. H04N 9/535; H04N 5/58
[52] U.S. Cl. ............................ 358/74; 358/39; 358/168; 358/169; 358/243
[58] Field of Search ............... 358/21 R, 27, 34, 39, 358/40, 74, 168, 169, 243

[56] References Cited

U.S. PATENT DOCUMENTS

| 4,096,518 | 6/1978 | Tuma | 358/74 |
|---|---|---|---|
| 4,126,884 | 11/1978 | Shanley | 358/21 R |

FOREIGN PATENT DOCUMENTS 2021037  11/1971  Fed. Rep. of Germany ........... 358/243

*Primary Examiner*—Robert L. Griffin
*Assistant Examiner*—Michael Allen Masinick
*Attorney, Agent, or Firm*—Eugene M. Whitacre; William H. Meagher; Ronald H. Kurdyla

[57] ABSTRACT

An automatic kinescope beam current limiter for a television receiver comprises a source of signal representative of kinescope beam current conduction, a first transistor responsive to the representative signal over first, second and third ranges of excessive beam currents above a threshold level, and a second transistor. A first control signal derived from the first transistor modifies the video signal peak-to-peak amplitude (contrast level) when beam currents above the threshold level occur. The output of the first transistor is selectively coupled to an input of the second transistor when beam currents beyond the first range occur. A second control signal derived from the second transistor modifies the video signal D.C. component (brightness level) to limit beam currents beyond the first range, whereby both the peak amplitude and D.C. components are modified over the second range. The first control signal is clamped to a fixed level in response to beam currents beyond the second range, whereby the video signal D.C. component is modified alone to limit beam currents over the third range.

16 Claims, 3 Drawing Figures

AUTOMATIC KINESCOPE BEAM CURRENT LIMITER WITH SEQUENTIAL CONTROL MODES

This invention concerns apparatus for automatically limiting excessive beam currents drawn by an image reproducing kinescope in a television receiver or equivalent video signal processing system. More particularly, the invention concerns such apparatus arranged to sequentially control the D.C. level and peak amplitude of a video signal in a direction to limit excessive beam currents, in a manner which minimizes the likelihood of control discontinuities between the sequential control modes.

The content of an image reproduced by a kinescope in a television receiver comprises luminance information, and also chrominance information in the case of a color image in a color television system. Picture information as displayed by the kinescope is typically defined by the peak-to-peak amplitude component of the video signal, relating to image contrast, and by the black level representative D.C. component of the video signal, relating to image brightness or background level. Both of these components can contribute to excessive beam currents drawn by the kinescope.

Excessive beam currents can cause a receiver to produce a degraded image such as by impairing the operation of the receiver deflection system, causing beam spot defocusing, and producing picture "blooming". High beam currents may also exceed the safe operating current capability of the kinescope, possibly causing damage to the kinescope and associated circuit components. Various automatic kinescope beam current limiters for sequentially controlling the peak-to-peak and D.C. components of the video signal are known. For example, U.s. Pat. No. 4,126,884—Shanley describes an average responding beam limiter system wherein a control voltage representative of excessive average beam current demand is utilized to control video signal peak amplitude (contrast level) over a first range of excessive beam current, and to control both video signal peak amplitude and D.C. level (contrast level and brightness level) over a second range of relatively greater excessive beam currents. U.S. Pat. No. 4,096,518—Tuma, et al. also describes an average responding beam current limiter system. In this system, a derived average representative control voltage is used to control the video signal D.C. level over a first range of excessive beam current, and to control the video signal peak amplitude over a second range of relatively greater excessive beam currents.

In accordance with the principles of the present invention, it is recognized as desirable for an automatic kinescope beam current limiter of the type including sequential control modes (e.g., contrast and brightness control modes), to operate in a manner which provides a smooth, continuous transition between the control modes. It is specifically recognized that, under certain circumstances, the transition point at which one control mode ends (e.g., contrast control) and the other control mode begins (e.g., brightness control) may not substantially coincide. This can occur, for example, when circuit tolerances of the beam limited sequencing control circuit vary from receiver to receiver. Operating supply and bias voltage variations, as well as temperature induced effects, can also produce offset errors which impair the operation of the sequencing control circuit such that the second control mode does not begin until a significant time after the first control mode ends.

When this occurs, the beam limiter network is rendered less effective for its intended purpose since a discontinuity exists between the control regions, during which time beam current control is absent. The occurrence of the control discontinuity may also produce a disturbing visible effect depending upon picture content. Illustratively, in an average responding beam current limiter system wherein picture contrast control (video signal peak-to-peak amplitude control) is provided over a first range of high beam currents and picture brightness control (video signal D.C. level control) is provided over a second range of relatively higher beam currents, a discontinuity between the contrast and brightness control modes will produce a sudden, undesirable increase in picture brightness during the discontinuity interval when beam limiting is absent, before the brightness control mode commences. Such an increase in picture brightess or background level can readily be noticed by a viewer, particularly when the high beam current condition results from repetitive image content. The discontinuity can also cause instability of the beam limiting closed control loop.

Apparatus according to the present invention is included in a system for processing an image representative video signal having a peak amplitude component determinative of image contrast and a D.C. component determinative of image brightness, the system including a video signal processing channel and a kinescope including an intensity control electrode for reproducing an image in response to video signals applied to the intensity control electrode from said channel.

A sensing network derives a signal representative of the magnitude of excessive beam currents conducted by the kinescope above a threshold current level. A first controllable conduction device with an input coupled to the representative signal and an output, exhibits varying current conduction in accordance with the magnitude of the representative signal over first, second and third ranges of successively greater excessive beam currents. A second controllable conductive device with an input and an output also is included. A first control signal derived from the output of the first device is coupled to the video channel for modifying one of the peak amplitude and D.C. components of the video signal in a direction to limit excessive beam currents beyond the threshold level. A threshold conduction network couples conduction variations of the first device to the input of the second device, when conduction of the first device corresponds to excessive beam currents beyond the first range. A second control signal derived from the output of the second device is coupled to the video channel for modifying the other of the peak amplitude and D.C. components of the video signal in a direction to limit beam currents beyond the first range, whereby both of the peak amplitude and D.C. components are modified to limit excessive beam currents over the second range. The first control signal is clamped to a substantially fixed level when conduction of the first device corresponds to excessive beam currents beyond the second range, whereby the other of the video signal peak amplitude and D.C. components is modified alone to limit excessive beam currents over the third range.

In accordance with a feature of the invention, the first control signal is utilized to modify the peak amplitude of the video signal over the first and second ranges of excessive currents, and the second control signal is utilized to modify the video signal D.C. component over the second and third ranges of excessive beam currents.

Figure 1:
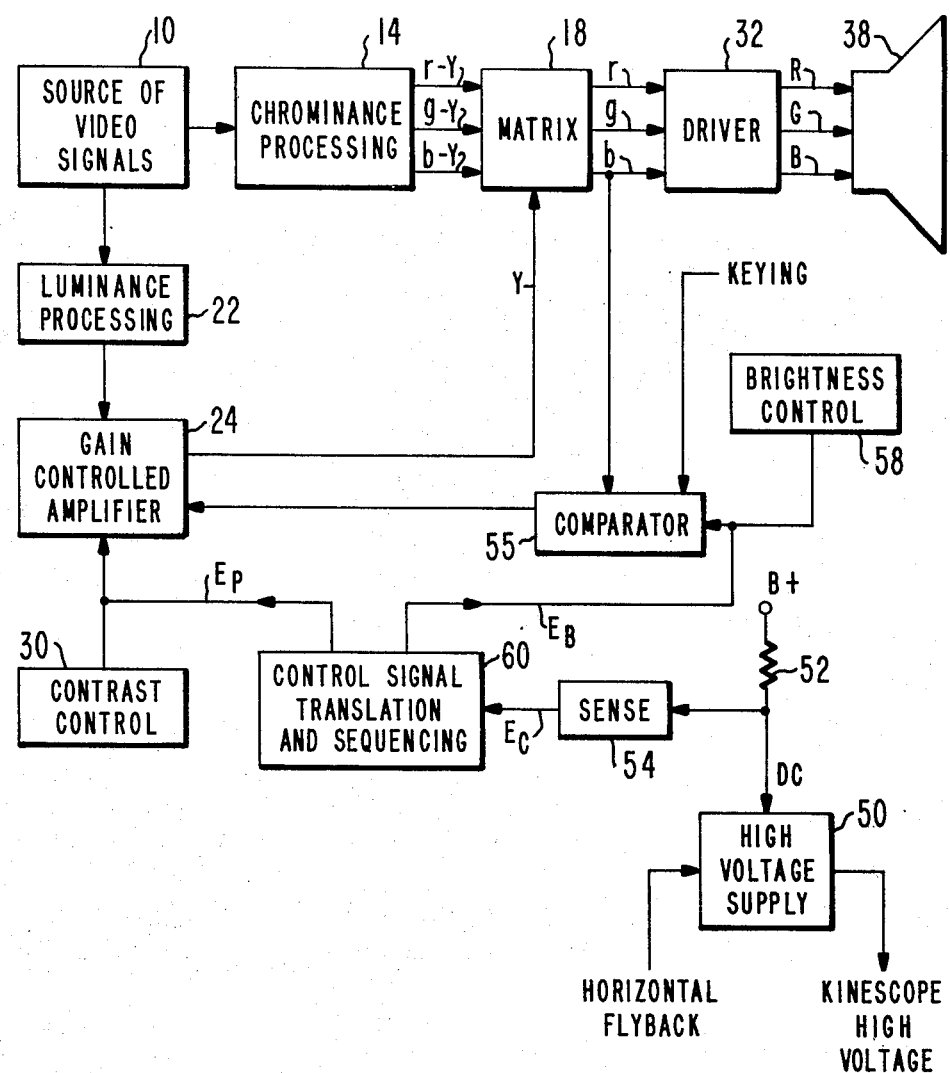
FIG. 1 illustrates a block diagram of a portion of a color television receiver including kinescope beam current limiter apparatus according to the present invention.

In FIG. 1, a source 10 of video signals including luminance and chrominance components provides a separated chrominance component from one output to a chrominance signal processing unit 14 in a chrominance channel of the receiver, which produces r-Y, g-Y and b-Y color difference signals. A separated luminance component is supplied from another output of unit 10 to a luminance processing unit 22 in a luminance channel of the receiver. Luminance signals processed by unit 22 are supplied to a signal input of a gain controlled luminance amplifier 24 (e.g., a differential amplifier). A contrast control unit 30 (e.g., a viewer adjustable potentiometer or adjustable resistance) is coupled to a gain control input of amplifier 24 for varying the gain of amplifier 24, and thereby the peak-to-peak amplitude of output signals from amplifier 24, in accordance with the setting of contrast control 30.

An amplified luminance signal (Y) from a signal output of amplifier 24 is supplied to a luminance-chrominance signal matrix 18 where the luminance signal is combined with the color difference signals from unit 14 to produce output r, g, and b color image representative signals. These signals are respectively amplified by a kinescope driver amplifier stage 32 to produce high level amplified R, G and B color signals. The R, G, B signals are supplied to respective red, green and blue cathode intensity control electrodes of a color kinescope 38.

The system of FIG. 1 also includes a keyed sampling comparator 55 arranged in a closed automatic brightness control loop as follows. One signal input of comparator 55 senses the low level blue (b) signal output of matrix 18, and a second signal input of comparator 55 senses a brightness determinative reference voltage provided from a manually adjustable brightness control 58 (e.g., a viewer adjustable potentiometer or adjustable resistor). Comparator 55 is keyed in response to keying signals occurring during periodic horizontal image blanking intervals of the video signal, for sampling and comparing the (blanking) level of the signal then appearing at the b signal output of matrix 18 with the brightness reference level from brightness control 58. If an imbalance exists beween these two levels, comparator 55 generates an output correction signal which is applied to a D.C. level control input of luminance amplifier 24. The correction signal serves to modify the D.C. level of the output signal from amplifier 24, and thereby also the D.C. level of the b signal output from matrix 18, in a direction to minimize the difference between the sampled signal inputs to comparator 55. By this mechanism, the luminance signal D.C. level and thereby the brightness determinative D.C. level of each of the r, g, b signals can be varied by varying the level of the signal applied to the brightness reference signal input of comparator 55. Additional details of the closed brightness control loop including comparator 55, amplifier 24 and matrix 18 are found in U.S. Pat. No. 4,197,557 of A. V. Tuma, et al. entitled, "Brightness Control Circuit Employing A Closed Control Loop."

Automatic kinescope beam current limiting is accomplished by means of an arrangement including a control signal translation and sequencing network 60, which receives an input control voltage $E_c$ derived from resupply currents supplied to a kinescope high voltage supply unit 50.

High voltage supply 50 (e.g., a voltage tripler) generates high operating voltages for ultor and focus electrodes of kinescope 38. Periodic horizontal flyback pulses developed during horizontal image retrace intervals are supplied to an input of high voltage source 50. A source of kinescope resupply current including an operating supply voltage (B+) and a current determining resistor 52 is coupled to a D.C. input of supply 50. Currents flowing into the D.C. input of supply 50 are representative of the beam current demand of the kinescope.

In this example, control voltage $E_c$ is representative of the average kinescope beam current demand, and is provided from an average responding sensing circuit 54. Sensing circuit 54 may comprise any circuit arrangement suitable for sensing the magnitude of average beam current demand from currents supplied via resistor 52 to high voltage source 50. For example, sensing circuit 54 can comprise networks of the type disclosed in U.S. Pat. No. 4,137,552—Serafini and U.S. Pat. No. 4,067,048—Norman.

Control network 60 responds to input control voltage $E_c$ for providing a contrast control beam current limiting signal $E_p$ and a brightness control beam current limiting signal $E_B$, when excessive average beam current demand above a given threshold level is present.

Control voltage $E_p$ is proportional to the magnitude of excessive average beam current demand over a first range of beam currents. Control voltage $E_p$ is applied to the gain control input of amplifier 24 for modifying the gain of amplifier 24, and thereby the peak-to-peak amplitude of signals processed by amplifier 24, in a direction to limit excessive beam current demand above the threshold level within the first range. Picture contrast is modified accordingly. Control voltage $E_B$ is proportional to excessive average beam currents over a second range of relatively greater beam currents. This control voltage is applied to the brightness reference signal input of comparator 55 for modifying the D.C. level of the video signal, and thereby picture brightness, in a direction of limit excessive beam currents within the second range of currents.

It is noted that control network 60 is also arranged to provide both contrast and brightness control signals during a transition region in response to a range of excessive beam currents between the first and second ranges of beam currents. The relationship between the contrast control region, transition control region, and brightness control region is illustrated by the diagram in FIG. 2, which will now be discussed.

When control voltage $E_c$ exceeds the threshold control level, excessive beam currents within the first range are limited by reducing the peak amplitude of the video signal, via control voltage $E_p$, over the contrast control region. The slope of the contrast control transfer function is given by $\Delta E_p/\Delta E_c$, representing the rate of change of video signal peak amplitude with control voltage $E_c$. In this example, the peak amplitude of the video signal can be reduced to a maximum of fifty percent of full peak-to-peak amplitude over the contrast control region, when the contrast control network is set to provide between fifty and one hundred percent of maximum contrast.

The transition control region consists of a contrast control portion and a brightness control portion, respectively encompassing overlapping segments of the end of the contrast control region and the beginning of the brightness control region. The slope of the transfer function for the contrast control segment of the transition region is given by $\Delta E_1/\Delta E_c$, representing the rate of change of video signal peak amplitude (picture contrast) with control voltage $E_c$. Similarly, the slope of the transfer function of the brightness control segment of the transition region is given by $\Delta E_2/\Delta E_c$, representing the rate of change of the video signal D.C. component (picture brightness) with control voltage $E_c$.

Excessive beam currents within a range of currents greater than currents limited within the contrast and transition regions are limited by varying the D.C. component of the video signal alone, via control voltage $E_B$, over the brightness control region. The slope of the transfer function for this region is given by $\Delta E_B/\Delta E_C$.

In this embodiment, each of the contrast, transition and brightness control regions encompasses approximately equal portions (one-third) of a normally expected range of excessive beam currents. However, a different relative proportioning of these control regions can be chosen. The beam current limiting control loop gains (transfer control functions) with respect to the brightness and contrast control regions can be made equal. Thus, the rate of change of contrast control in the contrast control region can be made to equal the rate of change of brightness control in the brightness control region (i.e., $\Delta E_p = \Delta E_B$). Moreover, in the transition region the rate of change of contrast control $\Delta E_1$ and the rate of change of brightness control $\Delta E_2$ can be related to the rates of change in the contrast and brightness control regions according to the expression $$\Delta E_p = \Delta E_B = (\Delta E_1) \times (\Delta E_2).$$

However, other relationships between these rates of changes can be selected in accordance with the closed loop gain requirements of a particular system.

The described transition region virtually eliminates the likelihood of a control discontinuity between the contrast and brightness control regions, and thereby eliminates the problems associated with such a discontinuity as mentioned earlier. In practice, it can be expected that high beam currents within the last control region will occur less frequently than high beam currents within the first control region. Controlling picture contrast over the first range of high beam currents is considered desirable insofar as a reduction in picture contrast is less likely to be perceived by a viewer, compared with a change in picture brightness or background level. However, the described sequence of contrast and brightness control can be reversed.

Although not shown, the output from contrast control unit 30 can also be applied to an appropriate gain control input of chrominance signal processor 14. In this case, control 30 operates as a "picture control" for simultaneously varying the peak-to-peak levels of the luminance and chrominance signals. Also in this case, the peak-to-peak amplitude of both the luminance signal and the chrominance signal are controlled in response to control voltage $E_p$ in the beam limiting mode.

Figure 2:
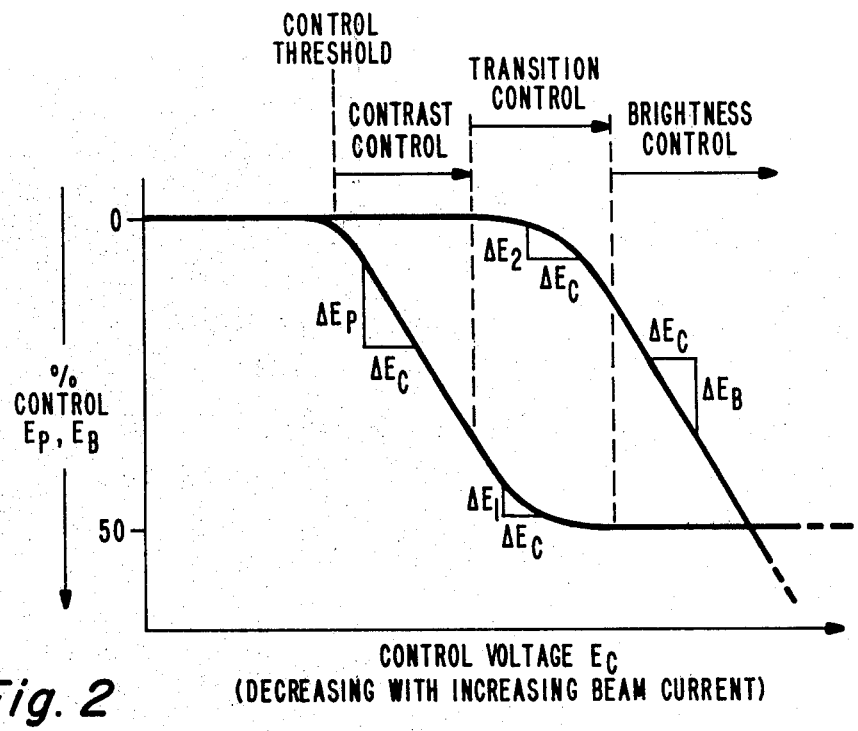
FIG. 2 depicts a diagram useful in understanding the operation of the beam limiter apparatus shown in FIG. 1.
Figure 3:
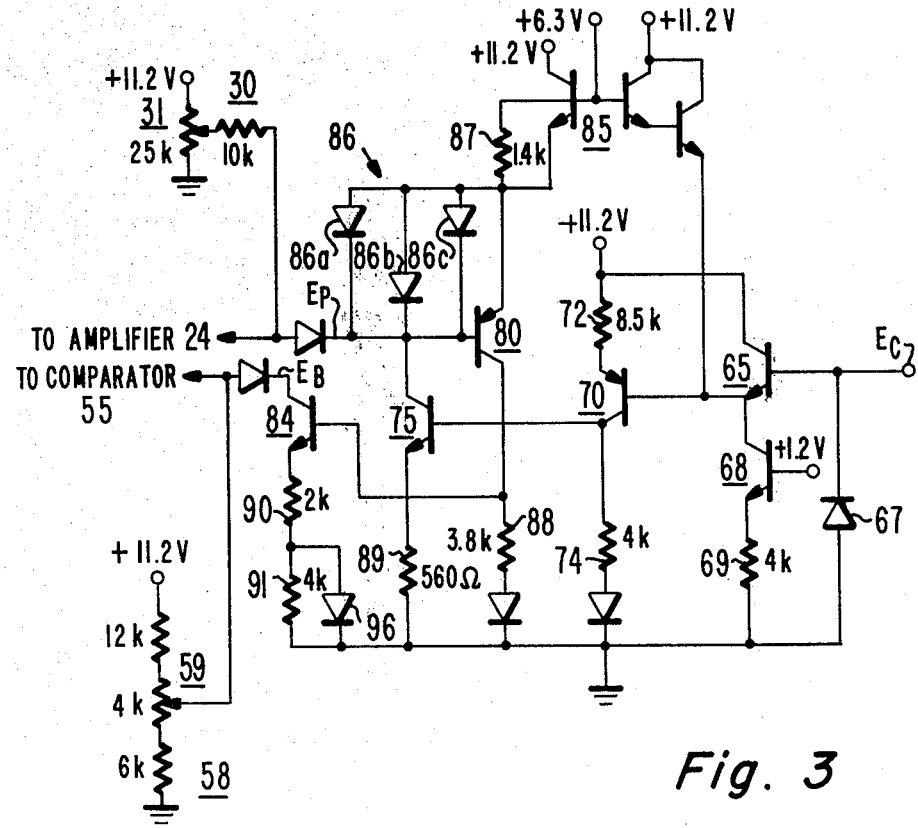
FIG. 3 shows a schematic circuit diagram detailing a portion of the apparatus of FIG. 1.

FIG. 3 shows a circuit arrangement of control unit 60 (FIG. 1) for providing the control transfer function shown in FIG. 2, and also discloses circuit details of contrast control 30 and brightness control 58.

In FIG. 3, the output control voltage $E_C$ from sensing network 54 (FIG. 1) exhibits a fixed positive level under normal conditions. In this example, voltages developed at the gain control input of amplifier 24 (FIG. 1) to which voltage $E_p$ is applied, and at the brightness reference input of comparator 55 (FIG. 1) to which voltage $E_B$ is applied, normally exhibit a nominal, fixed positive D.C. level for a given setting of contrast control 30 and brightness control 58. Contrast control 30 is shown in FIG. 3 as comprising a viewer adjustable potentiometer 31 and an associated D.C. voltage source (+11.2 volts). Brightness control 58 is shown as comprising a resistive network including a viewer adjustable potentiometer 59 and an associated D.C. voltage source (+11.2 volts).

In the beam current limiting mode, control voltage $E_c$ becomes increasingly less positive (i.e., negative-going) in proportion to the amount by which the beam current limiting threshold level is exceeded. The control voltage is applied to an input circuit including a follower transistor 65 and an associated current source comprising a transistor 68 and a resistor 69, and a protection diode 67 which serves to clamp or limit excessive negative-going excursions of voltage $E_C$. An inverting amplifier transistor 70 translates the control voltage as developed at an emitter of transistor 65, such that an inverted version of the control voltage appears at a collector output of transistor 70 with a magnitude established by the ratio of collector resistor 74 to emitter resistor 72 of transistor 70. The control voltage is then coupled via an inverting amplifier transistor 75 to a base electrode of a PNP transistor 80.

Transistor 75 conducts over the entire range of normally expected excessive beam currents. The collector current and voltage of transistor 75 respectively increase and decrease as control voltage $E_c$ decreases in response to excessive beam current in the first range, whereby contrast control voltage $E_p$ at the collector output of transistor 75 is caused to decrease a corresponding amount in a direction to limit beam current in the contrast control region. The slope of the transfer control function in the contrast control region is a function of the gain of transistor 75 in this region. This gain is determined by the ratio of the effective impedance presented by contrast control network 30, which comprises the collector load impedance of transistor 75, to the value of an emitter degeneration resistor 89. The slope of the contrast control transfer function, and the point at which the contrast control region begins, can be adjusted by tailoring the value of resistor 89 relative to the effective impedance of contrast control network 30.

A threshold conduction diode network 86 including diodes 86a, 86b and 86c is arranged with a transistor 80 in a "current mirror" configuration, whereby current flowing in each of diodes 86a, 86b and 86c equals the collector current of transistor 80. Current flowing in a resistor 87 (as will be discussed) divides between current in a diode network 86 and emitter current of transistor 80.

This arrangement of diode network 86 with transistor 80 is employed to achieve a desired mutual relationship, or scaling, of the collector currents of transistors 75 and 80. In this example, current supplied via resistor 87 divides between transistor 80 and diode network 86 such that the collector current of transistor 75 is three times greater than the collector current of transistor 80. However, gain proportioning with respect to the brightness control region also can be accomplished by employing a different number of diodes with network 86, and by tailoring the value of a collector resistor 88. The base current of transistor 80 (a high gain device) is negligible. Diode network 86 and transistor 80 are nonconductive over the contrast control region.

The transition control mode begins when contrast control voltage $E_p$ decreases sufficiently to forward bias diode network 86 for significant current conduction. This occurs when voltage $E_p$ at the cathodes of diodes 86a, 86b, 86c falls below a threshold level of +5.6 volts, when a substantially fixed offset voltage of +0.7 volts is developed across diodes 86 and, accordingly, across the emitter-base junction of transistor 80. The conduction of diode network 86 completes a path for current flow from a +6.3 volt source coupled to resistor 87, through resistor 87 and diode network 86, to the collector of transistor 75. At the same time, collector current of transistor 80 develops a voltage across resistor 88 sufficient to render a transistor 84 conductive. Transistor 84 conducts emitter current through resistors 90 and 91, and develops brightness control voltage $E_B$ at a collector output. A diode 96 in the emitter circuit of transistor 84 is nonconductive over the transition region.

The slope of the contrast control transfer function over the transition region is a function of the gain of transistor 75, as determined by the ratio of the collector load impedance to the emitter impedance of transistor 75. Over this region, the collector impedance of transistor 75 is reduced and comprises the effective load impedance of contrast network 30 and the effective load impedance presented by the combination of conductive diode network 86 and resistor 87, both of which load impedances are arranged so that the effective collector load impedance of transistor 75 is reduced compared with the collector load impedance of transistor 75 in the contrast region. Thus the contrast control gain of transistor 75 in the transition control region is less than the gain of transistor 75 in the contrast control region.

The slope of the brightness control transfer function over the transition region is a function of the gain of transistor 84. This gain is determined by the ratio of the effective impedance presented by brightness control network 58, which comprises the collector load impedance of transistor 84, to the combined values of emitter degeneration resistors 90 and 91.

The transition interval continues until current flowing in resistor 87 in response to the collector current of transistor 75 causes approximately 0.7 volts to be developed across resistor 87. A corresponding voltage then appears across the base-emitter junction of clamp transistor 85, causing transistor 85 to conduct. This base-emitter voltage of transistor 85 is substantially constant with increasing conduction of transistor 85 in response to control voltage $E_c$, and serves to clamp the voltage across resistor 87 at a fixed level (0.7 volts). Accordingly, the voltage drop across resistor 87 no longer varies with continuing changes in control voltage $E_c$ with increasing beam current.

This point determines the end of the transition control region, since further changes in control voltage $E_c$ (in response to increasingly higher beam currents) no longer produce a corresponding change in voltage $E_p$.

At this time voltage $E_p$ is clamped to a fixed level (+4.9 volts) equal to the base voltage of clamp transistor 85 (+6.3 volts), less the fixed voltage drop of diode network 86 (30 0.7 volts) and the fixed base-emitter voltage drop of clamp transistor 85 (+0.7 volts). After this point is reached, only brightness control voltage $E_B$ at the collector output of transistor 84 continues to vary with control voltage $E_c$, over the brightness control region.

In the brightness control region, increasing conduction of transistor 75 produces increased collector current and voltage of transistor 80. This in turn causes increased conduction of transistor 84 and an associated decrease in collector voltage ($E_B$) of transistor 84. Diode 96 conducts when the brightness control region begins at the end of the transition region, when a voltage sufficient to forward bias diode 96 is developed across resistor 91 in response to the emitter current of transistor 84.

The slope of the transfer control function in the brightness region is a function of the gain of transistor 84. This gain is determined by the ratio of the effective impedance presented by brightness network 58 to resistor 90 alone, since resistor 91 is bypassed with the very low impedance of diode 96, which conducts over the brightness control region. Since emitter degeneration resistor 91 is bypassed over this region, transistor 84 exhibits a greater gain than when operating in the transition region. Thus the slope of the control transfer function in the brightness control region can be adjusted by tailoring the value of resistor 90.

The collector current of transistor 75 is scaled predictably relatively to the collector current of transistor 80 in both the transition and brightness control regions. This result facilitates establishing predictable circuit gain and transfer control functions over the transition and brightness control regions.

In addition to serving as a sensing device to indicate the beginning of the transition region, diode network 86 also serves to ensure smooth, continuous operation of circuit 60 from the transition control mode to the brightness control mode. In the absence of diode network 86, the base voltage ($E_p$) of transistor 80 would be clamped to +4.9 volts over the transition region as mentioned before, except that the 0.7 volt drop of diode network 86 would be replaced by the similar emitter-base offset voltage of transistor 80. Also in this instance, the threshold conduction characteristic of the emitter-base PN junction of transistor 80 would serve to sense the beginning of the transition interval. However, with the base of transistor 80 and the collector of transistor 75 clamped in this instance, increasing collector current demand of transistor 75 can only be satisfied with base current from transistor 80, since no additional current is available from contrast network 30. If transistor 80 is a high gain device as in this embodiment, transistor 80 will then quickly saturate and essentially perform as a fast-acting switch, whereby the desired result of a smooth transition region is lost. This problem is eliminated in the disclosed embodiment, since diode network 86 provides a suitable path (also comprising the collector-emitter path of transistor 85 and resistor 87) for collector current of transistor 75. With the disclosed arrangement of diode network 86, transistor 80 acts as a relatively linear current mirror instead of as a nonlinear switch.

The clamping function performed by the base-emitter junction of transistor 85 can instead be accomplished by a diode. In such case, the diode would be coupled across resistor 87 and arranged in series with diode network 86 and the +6.3 volt source, and poled for current conduction in the same manner as the base-emitter junction of transistor 85.

What is claimed is:

1. In a system for processing an image representative video signal having a peak amplitude component determinative of image contrast and a D.C. component determinative of image brightness, said system including a video signal processing channel; and an image reproducing kinescope including an intensity control electrode for reproducing an image in response to video signals applied to said intensity control electrode from said channel; apparatus comprising:

means for deriving a signal representative of the magnitude of excessive beam currents conducted by said kinescope above a threshold current level;

first controllable conduction means with an input coupled to said representative signal and an output, and exhibiting varying current conduction in accordance with the magnitude of said representative signal over first, second and third ranges of successively greater excessive beam currents;

means for coupling a first control signal derived from said output of said first controllable conduction means to said video channel, to modify one of said peak amplitude and D.C. components of said video signal in a direction to limit excessive beam currents beyond said threshold level;

second controllable conduction means having an input and an output;

threshold conduction means for coupling conduction variations of said first controllable conduction means to said input of said second controllable conduction means, when said conduction of said first controllable conduction means corresponds to excessive beam currents beyond said first range;

means for coupling a second control signal derived from said ouput of said second controllable conduction means to said video channel to modify the other of said peak amplitude and D.C. components of said video signal in a direction to limit kinescope beam currents beyond said first range, whereby both said peak amplitude and D.C. components are modified to limit excessive beam currents over said second range; and means for clamping said first control signal to a substantially fixed level when conduction of said first controllable conduction means corresponds to excessive beam currents beyond said second range, whereby said other of said peak amplitude and D.C. components of said video signal is modified alone to limit excessive beam currehts over said third range.

2. Apparatus according to claim 1, wherein:
   said first control signal is coupled to said channel for modifying said peak amplitude component of said video signal, in the presence of excessive beam currents within said first range; and
   said second control signal is coupled to said channel for modifying said D.C. component of said video signal, in the presence of excessive beam currents within said third range.

3. Apparatus according to claims 1 or 2, wherein:
   said signal deriving means derives a control signal representative of the magnitude of average beam currents conducted by said kinescope.

4. Apparatus according to claim 3, wherein:
   said system includes high voltage supplying means for providing an operating potential for said kinescope; and
   said signal deriving means is coupled to said high voltage supplying means such that said derived control signal is representative of current drawn by said kinescope from said high voltage supplying means.

5. Apparatus according to claim 1, wherein:
   said first current range, said second current range, and said third current range are approximately equal in magnitude.

6. Apparatus according to claim 1, wherein:
   said first controllable conduction means comprises a first transistor with input and output electrodes;
   said threshold conduction coupling means comprises a second transistor having an input electrode coupled to said output electrode of said first transistor, and an output electrode; and
   said second controllable conduction means comprises a third transistor having an input electrode coupled to said output electrode of said second transistor, and an output electrode.

7. Apparatus according to claim 6, wherein:
   said threshold conduction means further comprises diode means coupled between said output electrode of said first transistor and a source of D.C. potential.

8. Apparatus according to claim 7, wherein:
   said diode means and said second transistor are arranged in a current mirror configuration.

9. Apparatus according to claim 7, wherein:
   said clamping means comprises a semiconductor PN junction coupled to said source of D.C. potential, said PN junction being arranged in series with said diode means and being similarly poled for current conduction with relation to said diode means; and
   a direct current impedance is coupled between said diode means and said source of D.C. potential.

10. Apparatus according to claim 7, wherein:
    said clamping means comprises a fourth transistor having a first electrode coupled to said source of D.C. potential, a second electrode coupled to an operating supply, and a third electrode coupled to said diode means, said second and third electrodes defining a main current conduction path of said fourth transistor in series with said diode means and similarly poled to for current conduction with relation to said diode means; and wherein
    a direct current impedance is coupled across said first and third electrodes of said fourth transistor.

11. Apparatus according to claim 6, wherein:
    said threshold conduction means further comprises a diode coupled between said output electrode of said first transistor and a source of D.C. potential, and arranged in a current mirror configuration with said second transistor;
    said clamping means comprises a fourth transistor with a base electrode coupled to said source of D.C. potential, a collector electrode coupled to an operating supply voltage, and an emitter electrode coupled to said diode, said fourth transistor and said diode being arranged in series and similarly poled for current conduction; and
    a resistance coupled between said diode and said source of D.C. potential.

12. Apparatus according to claim 11, wherein:

said resistance is coupled directly across the base-emitter junction of said fourth transistor.

13. Apparatus according to claim 1, wherein:
said first controllable conduction means exhibits a first gain over said first range, and a modified gain over said second range; and
said second controllable conduction means exhibits a first gain over said second range, and a modified gain over said third range.

14. Apparatus according to claim 13, wherein:
said first controllable conduction means includes a load impedance comprising said threshold conduction means, the gain of said first controllable conduction means being responsive to the magnitude of said load impedance; and
said first controllable conduction means exhibits said first gain when said threshold conduction means exhibits a first conductive state whereby said load impedance manifests a first magnitude, and said first controllable conduction means exhibits said modified gain when said threshold conduction means exhibits a second conductive state whereby said load impedance manifests a second magnitude.

15. In a television receiver for processing an image representative video signal comprising a luminance component having a peak amplitude component determinative of image contrast and a D.C. component determinative of image brightness, said receiver including a luminance signal processing channel; and an image reproducing kinescope including an intensity control electrode for reproducing an image in response to luminance signals applied to said intensity control electrode from said channel; apparatus comprising:
means for deriving a signal representative of the magnitude of excessive beam currents conducted by said kinescope above a threshold current level;
first controllable conduction means with an input coupled to said representative signal and an output, and exhibiting varying current conduction in accordance with the magnitude of said representative signal over first, second and third ranges of successively greater excessive beam currents;
means for coupling a first control signal derived from said output of said first controllable conduction means to said video channel, to modify one of said peak amplitude and D.C. components of said video signal in a direction to limit excessive beam currents beyond said threshold level;
second controllable conduction means having an input and an output;
threshold conduction means for coupling conduction variations of said first controllable conduction means to said input of said second controllable conduction means, when conduction of said first controllable conduction means corresponds to excessive beam currents beyond said first range;
means for coupling a second control signal derived from said output of said second controllable conduction means to said video channel to modify the other of said peak amplitude and D.C. components of said video signal in a direction to limit kinescope beam currents beyond said first range, whereby both said peak amplitude and D.C. components are modified to limit excessive beam currents over said second range; and
means for clamping said first control signal to a substantially fixed level when conduction of said first controllable conduction means corresponds to excessive beam currents beyond said second range, whereby said other of said peak amplitude and D.C. components of said video signal is modified alone to limit excessive beam currents over said third range.

16. Apparatus according to claim 15, wherein:
said first control signal is coupled to said channel for modifying said peak amplitude component of said luminance component, in the presence of excessive beam currents within said first range; and
said second control signal is coupled to said channel for modifying said D.C. component of said luminance component, in the presence of excessive beam currents within said third range.

* * * * *

UNITED STATES PATENT AND TRADEMARK OFFICE
CERTIFICATE OF CORRECTION

PATENT NO. : 4,253,110
DATED : February 24, 1981
INVENTOR(S) : Leopold A. Harwood, et al.

It is certified that error appears in the above—identified patent and that said Letters Patent is hereby corrected as shown below:

Column 1, line 64, the portion "limited" should read

-- limiter --.

Column 2, line 20, the portion "brightess" should read

-- brightness --.

Column 4, line 51, the portion "of" should read -- to --.

Column 8, line 4, the portion "30 0.7" should read

-- +0.7 --.

Signed and Sealed this

Twelfth Day of May 1981

[SEAL]

Attest:

RENE D. TEGTMEYER

Attesting Officer   Acting Commissioner of Patents and Trademarks